(12) United States Patent
Alonso et al.

(10) Patent No.: US 10,531,425 B2
(45) Date of Patent: Jan. 7, 2020

(54) METHODS AND APPARATUS FOR LOCATING MOBILE DEVICES USING WIRELESS SIGNALS IN MIXED MODE

(71) Applicant: The Nielsen Company (US), LLC, New York, NY (US)

(72) Inventors: Rafael E. Alonso, Tampa, FL (US); Joshua B. Hurwitz, Niles, IL (US)

(73) Assignee: The Nielsen Company (US), LLC, New York, NY (US)

( * ) Notice: Subject to any disclaimer, the term of this patent is extended or adjusted under 35 U.S.C. 154(b) by 95 days.

(21) Appl. No.: 15/721,183

(22) Filed: Sep. 29, 2017

(65) Prior Publication Data

US 2019/0104497 A1   Apr. 4, 2019

(51) Int. Cl.
*H04W 64/00* (2009.01)
*H04W 24/08* (2009.01)
*G01S 5/00* (2006.01)
*G01S 5/02* (2010.01)

(52) U.S. Cl.
CPC ......... *H04W 64/006* (2013.01); *H04W 24/08* (2013.01)

(58) Field of Classification Search
CPC .......................... H04W 64/006; H04W 24/08
See application file for complete search history.

(56) References Cited

U.S. PATENT DOCUMENTS

| | | | |
|---|---|---|---|
| 8,239,277 B2 | 8/2012 | Lee et al. | |
| 8,818,841 B2 | 8/2014 | Dupré et al. | |
| 8,847,754 B2 | 9/2014 | Buchheim et al. | |
| 8,965,398 B2 | 2/2015 | Zhu et al. | |
| 9,042,914 B2 | 5/2015 | Harvey et al. | |
| 9,113,309 B2 | 8/2015 | Uilecan et al. | |
| 2006/0240840 A1* | 10/2006 | Morgan | G01S 5/02 455/456.1 |
| 2008/0031208 A1 | 2/2008 | Abhishek et al. | |
| 2008/0147461 A1 | 6/2008 | Lee et al. | |
| 2012/0157115 A1* | 6/2012 | Jeong | H04W 24/02 455/456.1 |
| 2014/0050210 A1 | 2/2014 | Waters et al. | |

* cited by examiner

*Primary Examiner* — Joseph E Dean, Jr.
(74) *Attorney, Agent, or Firm* — Hanley Flight & Zimmerman, LLC

(57) ABSTRACT

Methods, apparatus, systems and articles of manufacture are disclosed for locating mobile devices using wireless signals in mixed mode. A disclosed method includes generating an access point signal matrix based on signal strength values based on first signal data collected at a mobile device corresponding to first signals received from a plurality of access points for a first period of time, and based on second signal data collected at the plurality of access points corresponding to second signals received from the mobile device and the plurality of access points for a second period of time, determining a first group of contour perimeters corresponding to first ones of the signal strength values in the access point signal matrix that satisfy a first threshold, the first group of contour perimeters including an obstructed contour perimeter corresponding to second ones of the signal strength values in the access point signal matrix that do not satisfy the first threshold, determining a second group of contour perimeters by replacing the obstructed contour perimeter with a corrected contour perimeter, and determining a location of the mobile device based on the second group of contour perimeters including the corrected contour perimeter.

20 Claims, 10 Drawing Sheets

METHODS AND APPARATUS FOR LOCATING MOBILE DEVICES USING WIRELESS SIGNALS IN MIXED MODE

FIELD OF THE DISCLOSURE

This disclosure relates generally to determining mobile device locations, and, more particularly, to methods and apparatus for locating mobile devices using wireless signals in mixed mode.

BACKGROUND

Mobile device manufacturers, mobile device service providers, and application developers use a number of techniques to detect locations of mobile devices. For example, some techniques determine a cell of a wireless network to which a mobile device is connected and report location based on the connected cell. Since a base station for each cell is in a fixed location, the cell identity can be translated into a location for a mobile user based on the location of the base station. Some techniques use wireless communication protocols (e.g., Bluetooth, Wi-Fi, etc.) to locate devices. For example, locations of fixed Wi-Fi access points can be used to determine locations of mobile devices associated with the Wi-Fi access points.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Figure 1:
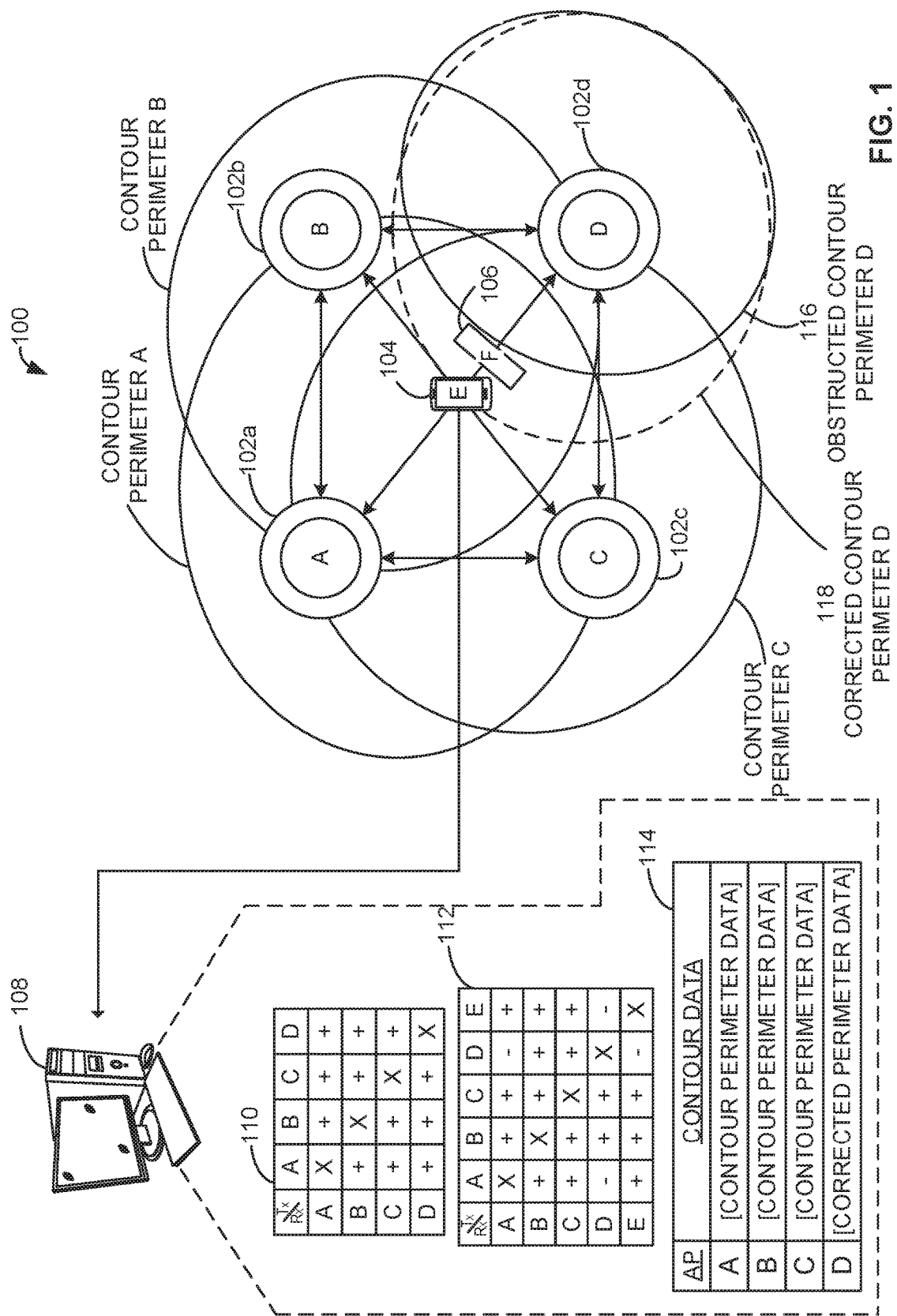
FIG. 1 illustrates an example mobile device location detection system that may be used to detect locations of mobile devices in accordance with the teachings of this disclosure.

Methods and apparatus for determining physical locations of mobile devices using wireless signals in mixed mode are disclosed. Prior methods for determining physical locations of a mobile device use a one-way signal from an access point to the mobile device. This becomes problematic when the line of sight between the access point and the mobile device is compromised. For example, the mobile device may be carried by a user walking in a mall. The user may enter a first store where the line of sight from the mobile device to an access point is obstructed by an object. Additionally, the mobile device may be in the line of sight of another access point located in a second, neighboring store. In this example, the mobile device is identified as located within the second, neighboring store, even though the mobile device is located in the first store. For entities that monitor shopping habits of individuals, this is a problem because stores that were never visited are credited as having been visited.

Examples disclosed herein enable determining physical locations of mobile devices more accurately than prior techniques. More specifically, examples disclosed herein use alternating receive modes and transmit modes between mobile devices and access points to track the locations of persons in areas in which signal-attenuating obstructions between the mobile devices and the access points substantially decrease or prevent useful wireless communications between the devices.

In some examples disclosed herein, a mobile device (e.g., a cell phone, a smart phone, a tablet, wearable device, etc.) is used as an interface between a person and a location detection platform. Specifically, the mobile device operates in a transmit mode to transmit signals via a wireless communication protocol (e.g., Bluetooth, Wi-Fi, etc.) for reception by wireless access points during a first period of time and then operates in a receive mode to monitor or listen for signals from the wireless access points within wireless communication range during a second period of time. The wireless access points (e.g., Wi-Fi access points, Bluetooth Low Energy (BLE) beacons, BLE tags, etc.) operate in a similar manner to the mobile device. Examples disclosed herein use signal characteristics of the signals detected by a mobile device and by wireless access points and use known fixed X-Y-Z locations of the wireless access points to determine an unknown physical location of the mobile device.

In operation, a wireless access point operates in a receive mode to monitor or listen for all mobile devices and access points transmitting corresponding identifiers. When operating in the receive mode, the wireless access point collects timestamps, Service Set Identifiers (SSID) of transmitting access points, identifiers of transmitting mobile devices, and signal strengths (e.g., in dBm) of received signals from the mobile devices and the other wireless access points. In some examples, the wireless access point may additionally or alternatively collect a quality measurement (e.g., a link-quality measurement), and examples disclosed herein may be additionally or alternatively based on such quality measurements. The wireless access point then switches to transmit mode and broadcasts its SSID (e.g., AP123). The other mobile devices and access points switch to receive mode and listen to this broadcast and collect a timestamp, an SSID and a signal strength from the transmitting wireless access point. This process repeats for a device location duration (e.g., X seconds: a device is in receive mode for X/2 seconds, and in transmit mode for X/2 seconds). As used herein, a device location duration is an amount of time during which one or more proximately located mobile device(s) and/or access point(s) operate in alternate receive and transmit modes to assess transmission signal strengths and, in turn, assess whether one or more access point(s) may be unusable (e.g., due to possible obstruction(s), loss of power of access point(s), etc.) to determine the location(s) of one or more mobile device(s).

To manage all of the data, a collection application is run on each mobile device and access point to collect the device identifiers, timestamps and signal strengths in log files. In some examples, the log files are plain text files in which each signal strength measurement in decibel-milliwatts (dBm) is recorded in a single record that includes a corresponding timestamp and device identifier. Additionally, the collection application creates a number of records in the log files to indicate when the mobile device(s)/access point(s) switched from receive mode to transmit mode and when the mobile device(s)/access point(s) switched from transmit mode to receive mode. At the conclusion of a device location phase during the device location duration, the mobile device(s) and access point(s) transmit all of the collected data to a data collection server.

The data collection server may analyze the signal strength values from the log files to train a neural network to map the surrounding areas with a contour perimeter corresponding to the wireless access points in the area. The contour perimeter map is representative of the location of the wireless access points within the region of wireless communication range. The map is utilized to determine the location of a mobile device even when it is not possible to receive a direct signal (e.g., line of sight) at the wireless access point from the mobile device due to an obstruction by a physical barrier. The disclosed examples do not require to connect or pair the mobile device and the wireless access point because the examples disclosed herein do not require wireless data transfer between devices. For example, techniques disclosed herein may detect signals and measure signal strengths based on device discovery communications without needing to associate, connect, or pair with one another. An example Wi-Fi device discovery exchange involves a first wireless station (e.g., an access point or wireless client) wirelessly transmitting a probe request communication, and a second wireless station responding by wirelessly transmitting a probe response communication. Of course, any other type of wireless signal exchanges based on any other suitable protocol may additionally or alternatively be used.

FIG. 1 illustrates an example mobile device location detection system 100 that may be used to detect locations of mobile devices in accordance with the teachings of this disclosure. The example mobile device location detection system 100 includes example access points (APs) 102a-d, an example mobile device 104, an example physical obstruction 106, an example server 108 (e.g., a computer), an example AP-only signal strength matrix 110, an example signal strength matrix 112, an example contour perimeter map 114, an example obstructed contour perimeter 116, and an example corrected contour perimeter 118.

In the illustrated example, to correct anomalies in measurement differences when the physical obstruction 106 is present, the wireless access points 102a-d and the mobile device 104 operate in alternating receive and transmit modes during a device location duration in such a way that at different times during the device location duration, a majority of devices are in receive mode to monitor or listen to one or more wireless signals from the mobile device 104 to determine signal strengths of the mobile device 104.

In the illustrated example, the wireless access points 102a-d are stationarily located at corresponding fixed locations. To determine signal strength measurements between one another in their space of operation, the wireless access points 102a-d exchange wireless signals or communications between one another during an AP-only calibration duration. For example, in an AP-only calibration phase during the AP-only calibration duration, the wireless access points 102a-d alternate between transmit and receive modes to measure signal strengths between one another. The measured signal strengths can differ between AP's due to different attenuation factors and distances between the access points 102a-d. At the conclusion of the AP-only calibration duration, the access points 102a-d transmit AP-only calibration log files to the server 108. The AP-only calibration log files include device IDs (e.g., SSIDs) of transmitting ones of the access points 102a-d and corresponding signal strength measurements collected during the AP-only calibration duration. The example server 108 analyzes the signal strength measurements from the log files and generates an example AP-only signal strength matrix 110 for the access points 102a-d. The example AP-only signal strength matrix 110 for the access points 102a-d is used to train a neural network that can more effectively locate the mobile device 104 when near the access points 102a-d.

When the mobile device 104 is present, the mobile device 104 and the access points 102a-d alternate between receive mode and transmit mode one or more times such that during at least one portion of the device location duration the mobile device 104 operates in a receive mode to detect signals of the access points 102a-d operating in a transmit mode. During at least another portion of the device location duration, the mobile device 104 operates in a transmit mode to transmit signals that are received by the access points 102a-d operating in a receive mode. In the illustrated example, each of the mobile device 104 and the access points 102a-d collect signal strength measurements, corresponding device IDs of the sources of the measured signals, and corresponding timestamps of the times of receipt of the measured signals. After saving this information in device location phase log files, the mobile device 104 and/or the access points 102a-d then send the log files to the example server 108 for processing. In the illustrated example, the server 108 analyzes the signal strength measurement values in the device location phase log files using a neural network and generates the signal strength matrix 112. In the illustrated example, the signal strength matrix 112 is generated by comparing the measured signal strength values collected when the mobile device was present to the AP-only signal strength matrix 110 measured during the AP-only automatic calibration duration. In some examples, when the signal strength values from the signal strength matrix 112 satisfy a threshold (e.g., the signal strength is greater than a decibel-milliwatt power value) the signal strength value is represented by a (+) symbol. Alternatively, when the signal strength values do not satisfy the threshold (e.g., the signal strength is less than the threshold), the signal strength value is represented by a (−) symbol.

In the illustrated example, the signal strength matrix 112 is used to generate the contour perimeter map 114. However, when the physical obstruction 106 is present, the neural network can determine that one or more of the access points 102a-d is/are unusable to determine the location of the mobile device 104 because the signals transmitted by that one or more of the access points 102a-d are overly attenuated by the physical obstruction 106. In the illustrated example, the signal strength values for access point 102d have been identified (e.g., represented by the (−) symbol) as varying beyond a threshold (because of the obstruction 106). As a result, the access point 102d is removed from the signal strength matrix 112.

The signal strength values used to train the neural network algorithm are used to generate the contour perimeter map 114 to map the surrounding areas with contour lines (e.g., contour perimeters A-D) corresponding to the wireless access points 102a-d in the area. In the illustrated example, the contour map 114 represents contour perimeter data for each one of the access points 102a-d based on the signal strength values from the signal strength matrix 112. To generate the contour perimeters A-D, the signal strength values from the signal strength matrix 112 are combined with the known locations of the access points 102a-d to isolate a point extending from each of the access points 102a-d representing a point on a boundary of a contour perimeter. A resulting contour perimeter is generated extending the same distance from that point around the access point. For example, to generate contour perimeter A, a point may be located at access point 102b to represent the signal strength boundary of access point 102a. As such, contour perimeter A is generated based on the point isolated at access point 102b relative to access point 102a. Thus, anything falling on or within contour perimeter A will be able to receive a signal from access point 102a (e.g., access point 102c, mobile device 104). In some examples, each device that receives a signal strength from an access point 102a-d will be used to determine the contour perimeter. In the illustrated example of FIG. 1, access points 102b-c may receive a signal from access point 102a, while access point 102d may not receive a signal from access point 102a. As such, contour perimeter A may be generated to extend through access points 102b-c but not through access point 102d. Additionally, the contour perimeter is the union of the individual access points contour perimeters and is dependent upon signal strength values. As such, contour perimeter A may vary depending on the devices (e.g., access point, mobile device) that receive a signal strength value from access point 102a. For example, if the obstruction 106 was not present, access point 102d may determine a signal strength value for access point 102a and the contour perimeter A may be extended to pass through access point 102d. Alternatively, a second obstruction may block the transmission path between access point 102a and access point 102b. As such, contour perimeter A would be reduced by the second obstruction to remove the portion passing through access point 102b. In some examples, contour perimeters A-D represent locations of devices in wireless communication range of the access points 102a-d. For example, contour perimeter A passes through access points 102b-c. As such, the contour perimeter A identifies the access points 102b-c as being within the wireless communication range of access point 102a. In the illustrated example, the contour perimeter map 114 is utilized to detect the location of the mobile device 104 when a direct signal from the mobile device 104 to the wireless access point 102d is blocked by the physical obstruction 106. Specifically, when the wireless access points 102a-d measure respective signal strength values corresponding to a signal from the mobile device 104, the obstructed contour perimeter 116 is generated based on the signal strength matrix 112 to locate the mobile device 104 based on the wireless access points 102a-d.

In the illustrated example, the wireless access point 102d includes signal strengths that vary unpredictably, as shown by the (−) symbol in the signal strength matrix 112. In examples disclosed herein, when signal strengths corresponding to signals from any one of the wireless access points 102a-d vary unpredictably, that wireless access point 102 is dropped from and/or corrected based on the contour perimeter map 114. As such, after dropping and/or correcting the wireless access point 102d in the illustrated example, contour perimeter data for wireless access points 102a-c are used generate the corrected contour perimeter 118 to locate the mobile device 104.

In this manner, alternating devices between transmit mode and receive mode for transmitting their corresponding identifiers and receiving identifiers of other devices is used to provide each device with signal strength measures corresponding to other device transmissions. Thus, the contour perimeter map 114 can then determine where obstructions may be present relative to other devices based on comparisons of measured signal strengths corresponding to the same received signals.

Figure 2:
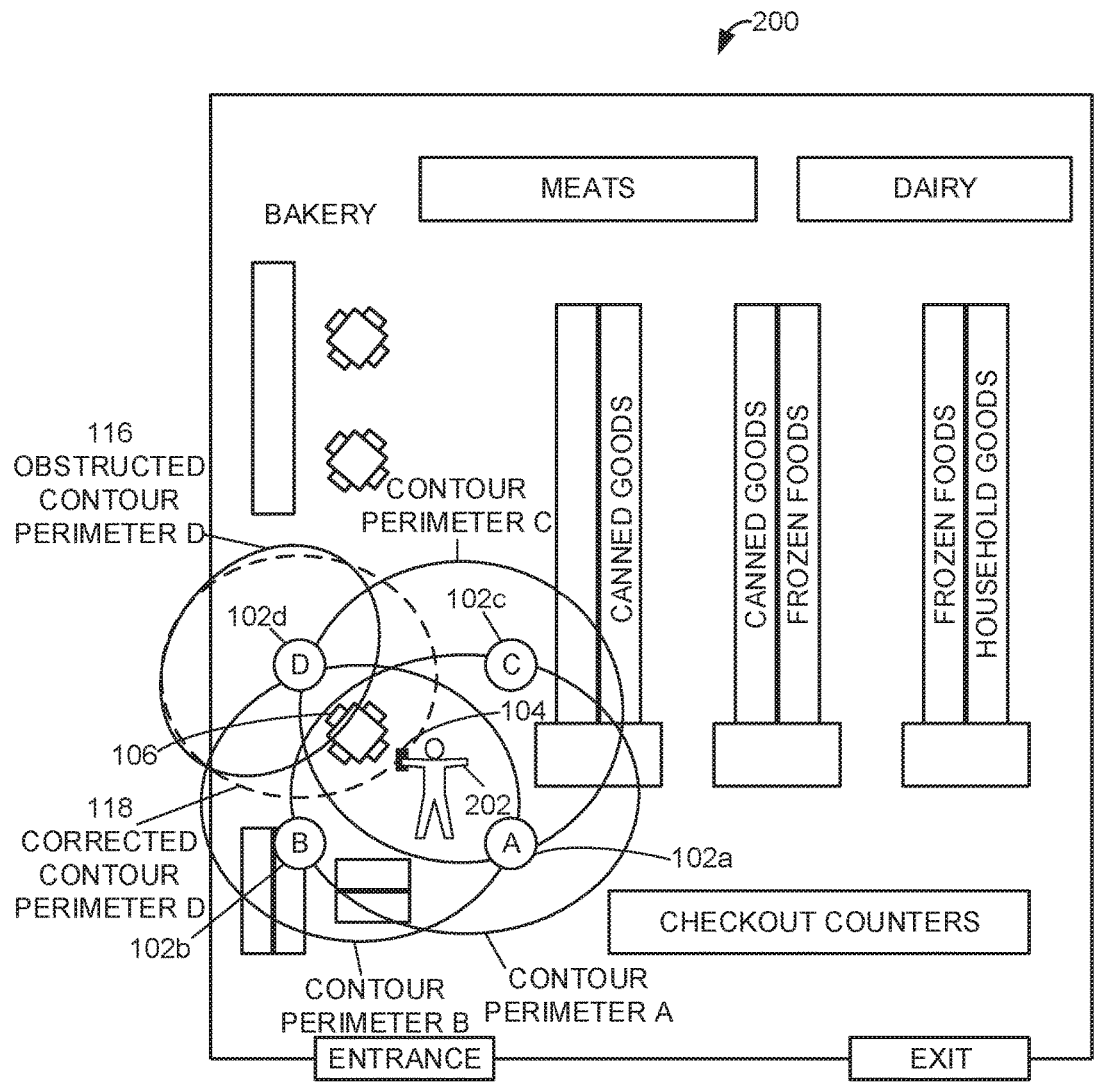
FIG. 2 illustrates an example environment in which the example mobile device location detection system of FIG. 1 may be implemented.

FIG. 2 illustrates an example environment 200 in which the example mobile device location detection system 100 of FIG. 1 may be implemented. The example environment 200 includes the access points 102a-d, the mobile device 104, the physical obstruction 106, the obstructed contour perimeter 116, the corrected contour perimeter 118 and a user 202.

In the illustrated example, the user 202, carrying the mobile device 104, enters the example environment 200 and begins walking around. In this example, the environment is a grocery store. The access points 102a-d and the mobile device 104 begin alternating receive modes and transmit modes to track the locations of the user 202 in the environment 200.

In the illustrated example, the wireless access points 102a-d are stationarily located at corresponding fixed locations. Prior to the user 202 entering the environment 200, the access points 102a-d operate in an AP-only calibration mode during an AP-only calibration duration. The wireless access points 102a-d alternate between transmit and receive modes to measure signal strengths between one another. For example, the access points 102a-d may use wireless discovery communications such as probe requests and probe responses. At the conclusion of the AP-only calibration duration, the access points 102a-d transmit AP-only calibration log files to the server 108 of FIG. 1. The AP-only calibration log files include device IDs (e.g., SSIDs) of transmitting ones of the access points 102a-d and corresponding signal strength measurements collected during the AP-only calibration duration. The example server 108 analyzes the signal strength measurements from the log files and generates an example AP-only signal strength matrix 110 (FIG. 1) for the access points 102a-d. The example AP-only signal strength matrix 110 for the access points 102a-d is used to train a neural network that can more effectively locate the mobile device 104 when near the access points 102a-d.

To locate the user 202, the mobile device 104 and the access points 102a-d alternate between receive mode and transmit mode one or more times such that during at least one portion of a device location duration the mobile device 104 operates in a receive mode to detect signals of the access points 102a-d operating in a transmit mode. During at least another portion of the device location duration, the mobile device 104 operates in a transmit mode to transmit signals that are received by the access points 102a-d operating in a receive mode. For example, the access points 102a-d and the mobile device 104 can use wireless discovery communications such as probe requests and probe responses. Each of the mobile device 104 and the access points 102a-d collect signal strength measurements, corresponding device IDs of the sources of the measured signals, and corresponding timestamps of the times of receipt of the measured signals. After saving this information in device location phase log files. The mobile device 104 and/or the access points 102a-d then send the log files to the example server 108 for processing.

The example data collection server 108 analyzes the signal strength values from the log files to generate the contour perimeter map 114 (FIG. 1), which maps the environment 200 with contour perimeters A-D corresponding to the wireless access points 102a-d in the environment 200. The contour perimeter map 114 is utilized to determine the location of the mobile device 104 in the presence of the physical barrier 106 (e.g., a display).

In the illustrated example, the user 202 is near (e.g., adjacent) the physical barrier 106 (e.g., a product display, store shelving, etc.) during the device location duration. For example, the user 202 may be looking at or selecting a product. As such, the access point 102d is obstructed from the mobile device 104 by the physical barrier 106. As a result, when the data collection server 108 analyzes the signal strengths at the conclusion of the device location duration, the first contour perimeter 116 that is generated incorrectly identifies the location of the physical barrier 106 as the location of the mobile device 104. In a similar manner as FIG. 1, the server 108 identifies unsuitably varying signals from the access point 102d and drops the access point 102d from the contour perimeter map 114. For example, the signals from the access point 102d are not suitable because they attenuate unpredictably because of the physical barrier 106. As such, the corrected contour perimeter d 118 is generated to properly identify the location of the mobile device 104, and, in turn, the user 202. For example, the server 108 generates the corrected contour perimeter d 118 by selecting known contour perimeter data for access point 102d that was calculated during the calibration phase and calculating the corrected contour perimeter d 118 based on the known contour perimeter data for access point 102d.

Figure 3:
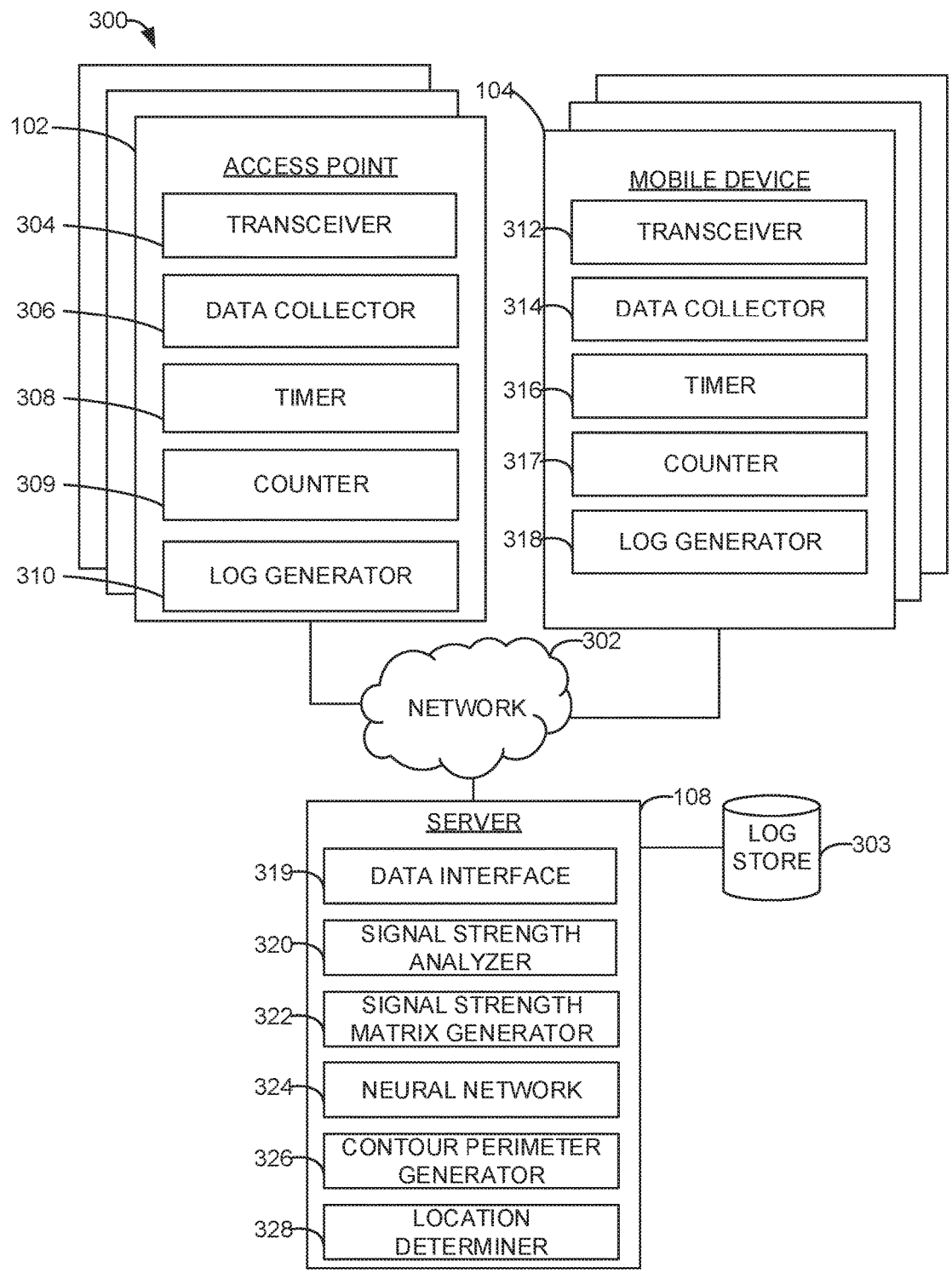
FIG. 3 illustrates an example mobile device location detection system that may be used to implement examples disclosed herein.

FIG. 3 illustrates an example mobile device location system 300 that may be used to implement examples disclosed herein. The example mobile device location system 300 includes an access point 102 (as representative of the access points 102a-d of FIGS. 1 and 2), the mobile device 104, the server 108, a network 302, and a log store 303. The example access point 102 includes an example transceiver 304, an example data collector 306, an example timer 308, an example counter 309, and an example log generator 310. The mobile device 104 of the illustrated example includes an example transceiver 312, an example data collector 314, an example timer 316, an example counter 317, and an example log generator 318. The example server 108 includes an example data interface 319, an example signal strength analyzer 320, an example signal strength matrix generator 322, an example neural network 324, and an example contour perimeter generator 326, and an example location determiner 328.

The example network 302 of the illustrated example is a wired or wireless network suitable for communicating information between the access point 102, the mobile device 104, and the server 108. The example network 302 may be implemented using a local area network and/or a wide area network (e.g., the Internet). However, any type(s) of past, current, and/or future communication network(s), communication system(s), communication device(s), transmission medium(s), protocol(s), technique(s), and/or standard(s) could be used to communicatively couple the components via any type(s) of past, current, and/or future device(s), technology(ies), and/or method(s), including voice-band modems(s), digital subscriber line (DSL) modem(s), cable modem(s), Ethernet transceiver(s), optical transceiver(s), virtual private network (VPN) connection(s), Institute of Electrical and Electronics Engineers (IEEE) 802.11x (e.g., WiFi) transceiver(s), IEEE 802.16 (e.g.,. WiMax, ZigBee), access point(s), access provider network(s), etc. Further, the example network 104 may be implemented by one or a combination(s) of any hardwire network, any wireless network, any hybrid hardwire and wireless network, a local area network, a wide area network, a mobile device network, a peer-to-peer network, etc. For example, a first network may connect the access points 102 to the server 108, and a second network may connect the mobile device 104 to the server 108.

The example log store 303 is used to store log files from the server 108. As discussed in more detail below, the server 108 receives the log files from the access point 102 and the mobile device 104.

The example transceiver 304 is used to receive wireless signals from other access points/mobile devices and transmit signals to other access points/mobile devices within the area during an AP-only calibration phase, and during a device location phase. The example transceiver 304 may be implemented using any suitable wireless technology such as Bluetooth, Wi-Fi, ZigBee, WiMax, etc.

The data collector 306 of the illustrated example collects data relating to the signals received by the transceiver 304 and manages data collection processes. For example, when the access point 102 operates in the receive mode, the data collector 306 collects timestamps, Service Set Identifiers (SSID) of transmitting access points, identifiers (e.g., Universal Device ID (UDID), Identifier For Advertising (IDFA), Identifier For Vendor (IDFV), Android ID, device name, media access control (MAC) address, etc.) of transmitting mobile devices 104, and signal strengths (e.g., in dBm) of received signals from the mobile devices 104 and the other wireless access points 102 for a first period of time during a device location duration. The wireless access point 102 then switches to transmit mode and broadcasts its SSID (e.g., AP123) for a second period of time during the device location duration. The data collector 306 collects transition timestamps to indicate when the access point 102 switched between receive mode and transmit mode. At the conclusion of the device location duration, the data collector 306 sends all of the collected data to the example log generator 310 for further processing.

The example timer 308 is provided to control durations for receiving and transmitting signals. For example, when managing data collection, the data collector 306 or a processor of the access point 102 uses the timer 308 to track a duration for which the access point 102 operates in a receive mode for a first period of time during an AP-only calibration duration, and a transmit mode for a second period of time during the AP-only calibration duration.

The example counter 309 is provided to control how many AP-only calibration durations occur during an AP-only calibration phase, and how many device location durations occur during a device location phase. For example, the timer 308 runs for a designated period of time during an AP-only calibration phase. During the AP-only calibration phase, the counter 309 tracks the number of AP-only calibration durations that have occurred during the AP-only calibration phase, for example. As such, when the example data collector 306 or processor determines that a first AP-only calibration duration has ended, the example data collector 306 or processor resets the timer 308 for the second AP-only calibration duration and increments the counter 309 corresponding to the completed first AP-only calibration duration. The process continues until the data collector 306 or processor determines that the counter 309 equals a number of AP-only calibration durations to be performed.

The example log generator 310 groups the collected data from the data collector 306 into AP-only collected data and mobile device collected data. For example, the log generator 310 parses through all of the collected data and identifies if the collected data belongs to an access point or a mobile device and separates the collected data accordingly. The example log generator 310 groups the data by device to identify which signals were collected during the AP-only calibration phase and which signals were collected during the device location phase.

The example log generator 310 generates a log file for the grouped signal data to send to the server 108. For example, the log generator 310 generates individual records for each of the signals including device identifiers, timestamps and signal strengths. Additionally, the log generator 310 creates a number of records in the log files to indicate when the mobile device 104 and access points 102 switched from receive mode to transmit mode and when they switched from transmit mode to receive mode. Alternatively, the log generator 310 may create a separate log file indicating when the mobile device 104 and the access points 102 switched from receive mode to transmit mode and when they switched from transmit mode to receive mode. At the conclusion of the device location phase, the log generator 310 transmits all of the log files to the data collection server 108 via the network 302. Although the example log generator 310 is shown in the access point 102, in other examples the example log generator 310 may be implemented at the example server 108.

In the illustrated example, the transceiver 312, the data collector 314, the timer 316, the counter 317, and the log generator 318 of the mobile device 104 operate in a similar manner as the transceiver 304, the data collector 306, the timer 308, the counter 309, and the log generator 310, respectively, of the access points 102, as described above. Although the example log generator 318 is shown in the mobile device 104, in other examples the log generator 318 may be implemented at the example server 108.

The example data interface 319 of the server 108 receives the log files from the access point 102 and the mobile device 104. In the illustrated example, the data interface 319 stores the log files in the log store 303. Also in the illustrated example, the data interface 319 accesses data from the log files. For example, the data interface 319 may access data for an AP-only calibration phase or may access data for a device location phase.

At the example data collection server 108, the example signal strength analyzer 320 accesses the log files from the log generator 310 and analyzes the signal strength measurements from the log files to identify if the signal strength values satisfy a threshold (e.g., determines whether each signal strength is greater than a threshold decibel-milliwatt power value). In some examples, the signal strength analyzer 320 may be able to identify the timestamps belonging to a specific time period. For example, the signal strength analyzer 320 may identify the timestamps collected during an AP-only calibration phase and subsequently analyze signal strengths for all of the access points 102a-d corresponding to the AP-only calibration phase. Alternatively, the signal strength analyzer 320 may identify signals corresponding to a device location phase. As such, the signal strength analyzer 320 may analyze the signals received by the access points 102a-d and the mobile device 104 during the device location phase. The signal strength analyzer 320 analyzes the signal strength values in the log files and identifies if the signal strength values satisfy a threshold.

The example signal strength matrix generator 322 accesses the log files from the signal strength analyzer 320, along with indications of whether the signal strength values satisfy a threshold. The example signal strength matrix generator 322 separates or parses the data from the log files based on device identifiers. For example, the signal strength matrix generator 322 identifies the access point 102a (FIGS. 1 and 2) and the signals received by the access point 102a. The signal strength matrix generator 322 populates a signal strength matrix (e.g., the signal strength matrix 112 of FIG. 1) using the data from the signal strength analyzer 320 (e.g., indications of whether the signal strength values satisfy the threshold). When the example signal strength analyzer 320 identifies a signal strength value as satisfying the threshold, the example signal strength matrix generator 322 populates a corresponding position in a signal strength matrix with a (+) symbol. When the example signal strength analyzer 320 identifies a signal strength value as not satisfying the threshold, the example signal strength matrix generator 322 populates a corresponding position in the signal strength matrix with a (−) symbol. In examples disclosed herein, the example signal strength matrix generator 322 generates an AP-only calibration signal strength matrix (e.g., the signal strength matrix 110 of FIG. 1) and a device location signal strength matrix (e.g., the signal strength matrix 112 of FIG. 1). The example signal strength matrix generator 322 sends the signal strength matrices to the neural network 324 for further processing.

To train the example neural network 324, the signal strength matrix generator 322 sends the AP-only calibration signal matrix (e.g., the signal strength matrix 110) as input to the neural network 324. The neural network 324 processes the AP-only calibration signal matrix along with the known locations of the access points 102a-d, and identifies attenuation factors (e.g., attenuation multipliers) associated with the signal strength values. For example, the neural network 324, locates the signal strength values identified with a (+) symbol and associates those signal strength values as satisfactory. Over time, the neural network 324 accumulates signal strength values from signal strength matrices and identifies an attenuation factor for a specific transmission path (e.g., access point 102a transmitting a signal to access point 102b). As such, the neural network 324 is able to identify an attenuation factor tolerance associated with specific transmission paths. For example, the neural network 324 may determine a lower threshold attenuation factor that is lower than the expected attenuation factor (e.g., an attenuation factor that results in a stronger signal strength value). The neural network 324 may also determine an upper threshold attenuation factor that is higher than the expected attenuation factor (e.g., an attenuation factor that results in a weaker signal strength value). The neural network 324, uses the above lower to upper threshold attenuation factor range as an attenuation factor tolerance of acceptable signal strength values. For example, when the neural network 324 identifies signal strengths corresponding to attenuations lower than the upper threshold attenuation factor, the neural network 324 identifies the signal strength values as acceptable. Additionally, when the neural network 324 identifies signal strengths corresponding to attenuations higher than the lower threshold attenuation factor, the neural network 324 analyzes the signal strength matrix to determine if the signal strength matrix threshold was satisfied (e.g., is the transmission path populated with a (+) symbol). If the signal strength matrix threshold was satisfied, the neural network 324 identifies the signal strength values as acceptable. Therefore, the neural network 324 allows attenuation factors to vary within the attenuation factor tolerance. In this manner, the neural network 324 uses the attenuation factor tolerance to identify any attenuation factors of specific transmission paths that vary unpredictably. For example, the neural network 324 may identify an attenuation factor that falls outside of the attenuation factor tolerance for a specific transmission path. As such, the neural network 324 may correct the signal strength value or identify the specific transmission path as obstructed and not useful in generating contour perimeters (e.g., the contour perimeters a-d of FIGS. 1 and 2).

In some examples, the contour perimeter generator 326 generates a contour perimeter based on the data received from the neural network 324. For example, the neural network 324 may identify that an access point is obstructed because of an attenuation factor outside of the attenuation factor tolerance (e.g., not satisfying the attenuation factor tolerance) for a specific transmission path. As such, the contour perimeter generator 326 may determine a point in space for a given access point using known signal strength distance algorithms. Once the contour perimeter generator 326 determines a point in space, the contour perimeter generator 326 may extend that point around the perimeter of the access point. The contour perimeter generator 326 repeats the process until all the access points have contour perimeters. In some examples, the contour perimeter generator 326 may determine a plurality of points located around the access point and determine the contour perimeter based on the identified points. For example, the contour perimeter generator 326 may identify points at access point 102c and the mobile device 104. As such, the contour perimeter generator 326 may generate a contour perimeter extending through the access point 102c and the mobile device 104, but not through access point 102b or access point 102d.

The location determiner 328 determines the location of the mobile device 104 using the generated contour perimeters generated by the contour perimeter generator 326 (e.g., the contour perimeters A-D of FIGS. 1 and 2). For example, the location determiner 328 may identify a union of all the generated contour perimeters and determine the location of the mobile device 104 based on the union. In some examples, the location determiner 328 may implement a trilateration method to locate the mobile device 104 based on the generated contour perimeters.

While an example manner of implementing the example access point 102, the example mobile device 104, and the example server 108 of the example mobile device location detection system 100 FIG. 1 is illustrated in FIG. 3, one or more of the elements, processes and/or devices illustrated in FIG. 3 may be combined, divided, re-arranged, omitted, eliminated and/or implemented in any other way. Further, the example data collector 306, the example timer 308, the example counter 309, the example log generator 310, and/or, more generally, the example access point 102, and/or the example data collector 314, the example timer 316, the example counter 317, the example log generator 318 and/or, more generally, the example mobile device 104, and/or the example data interface 319, the example signal strength analyzer 320, the example signal strength matrix generator 322, the example neural network 324, the example contour perimeter generator 326, the example location determiner 328 and/or, more generally, the example server 108 of FIG. 3 may be implemented by hardware, software, firmware and/or any combination of hardware, software and/or firmware. Thus, for example, any of the example data collector 306, the example timer 308, the example counter 309, the example log generator 310 of the example access point 102, the example data collector 314, the example timer 316, the example counter 317, the example log generator 318 of the example mobile device 104, the example data interface 319, the example signal strength analyzer 320, the example signal strength matrix generator 322, the example neural network 324, the example contour perimeter generator 326, the example location determiner 328 of the example server 108 and/or, more generally, the example access point 102, the example mobile device 104, and/or the example server 108 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example data collector 306, the example timer 308, the example counter 309, the example log generator 310 of the example access point 102, the example data collector 314, the example timer 316, the example counter 317, the example log generator 318 of the example mobile device 104, the example data interface 319, the example signal strength analyzer 320, the example signal strength matrix generator 322, the example neural network 324, the example contour perimeter generator 326, the example location determiner 328 of the example server 108 and/or, more generally, the example access point 102, the example mobile device 104, and/or the example server 108 is/are hereby expressly defined to include a non-transitory computer readable storage device or storage disk such as a memory, a digital versatile disk (DVD), a compact disk (CD), a Blu-ray disk, etc. including the software and/or firmware. Further still, the example access point 102, the example mobile device 104, and/or the example server 108 may include one or more elements, processes and/or devices in addition to, or instead of, those illustrated in FIG. 3, and/or may include more than one of any or all of the illustrated elements, processes and devices.

Figure 4:
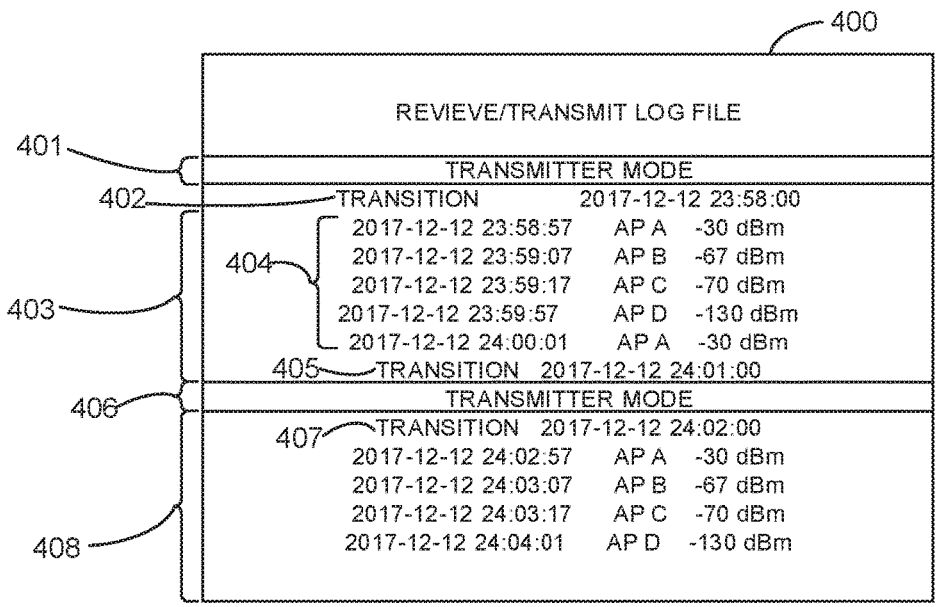
FIG. 4 illustrates an example log file that may be implemented using examples disclosed herein.

FIG. 4 is an example receive/transmit log file 400 that may be implemented using the examples disclosed herein. Log files similar to the example log file 400 may be generated by the access points 102a-d and the mobile device 104 of FIGS. 1-3. The example log file 400 includes a first transmitter mode marker 401, a first transition timestamp 402, first receiver mode duration section 403, a received signals log entries 404, a second transition timestamp 405, second transmitter mode marker section 406, a third transition timestamp 407, and a second receiver mode duration section 408. In the illustrated example, the first transmitter mode marker 401 indicates that a device is in transmitter mode. The first transition timestamp 402 identifies that a transmitter mode corresponding to the first transmitter mode marker 401 has ended and the device switches to receive mode. The first receiver mode duration section 403 identifies signal reception information that the device receives. Received signals log entries 404 include timestamps, device identifiers and signal strength values for the signals received during a first receiver mode duration corresponding to the first receiver mode duration section 403. The second transition timestamp 405 identifies that the first receiver mode duration has ended, and a second transmitter mode corresponding to the second transmitter mode marker 406 has begun. The third transition timestamp 407 indicates when the device switches back to receive mode for a second receiver mode duration corresponding to the second receiver mode duration section 408. In the illustrated example, the log file 400 includes records for the signal reception information and transition timestamps. Alternatively, the signal reception information may be stored in one log file and the transition timestamps may be stored in a second log file.

Flowcharts representative of example machine readable instructions for implementing the example access points 102a-d, the example mobile device 104, and the example server 108 of FIGS. 1-3 are shown in FIGS. 5-9. In these examples, the machine readable instructions comprise one or more programs for execution by one or more processors such as the processor 1012 shown in the example processor platform 1000 discussed below in connection with FIG. 10. The program(s) may be embodied in software stored on a non-transitory computer readable storage medium such as a CD-ROM, a floppy disk, a hard drive, a digital versatile disk (DVD), a Blu-ray disk, or a memory associated with the processor 1012, but the entireties of the programs and/or parts thereof could alternatively be executed by a device other than the processor 1012 and/or embodied in firmware or dedicated hardware. Further, although the example program(s) is/are described with reference to the flowcharts illustrated in FIGS. 5-9, many other methods of implementing the example access points 102a-d, the example mobile device 104, and the example server 108 of FIGS. 1-3 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIGS. 5-9 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended.

Figure 5:
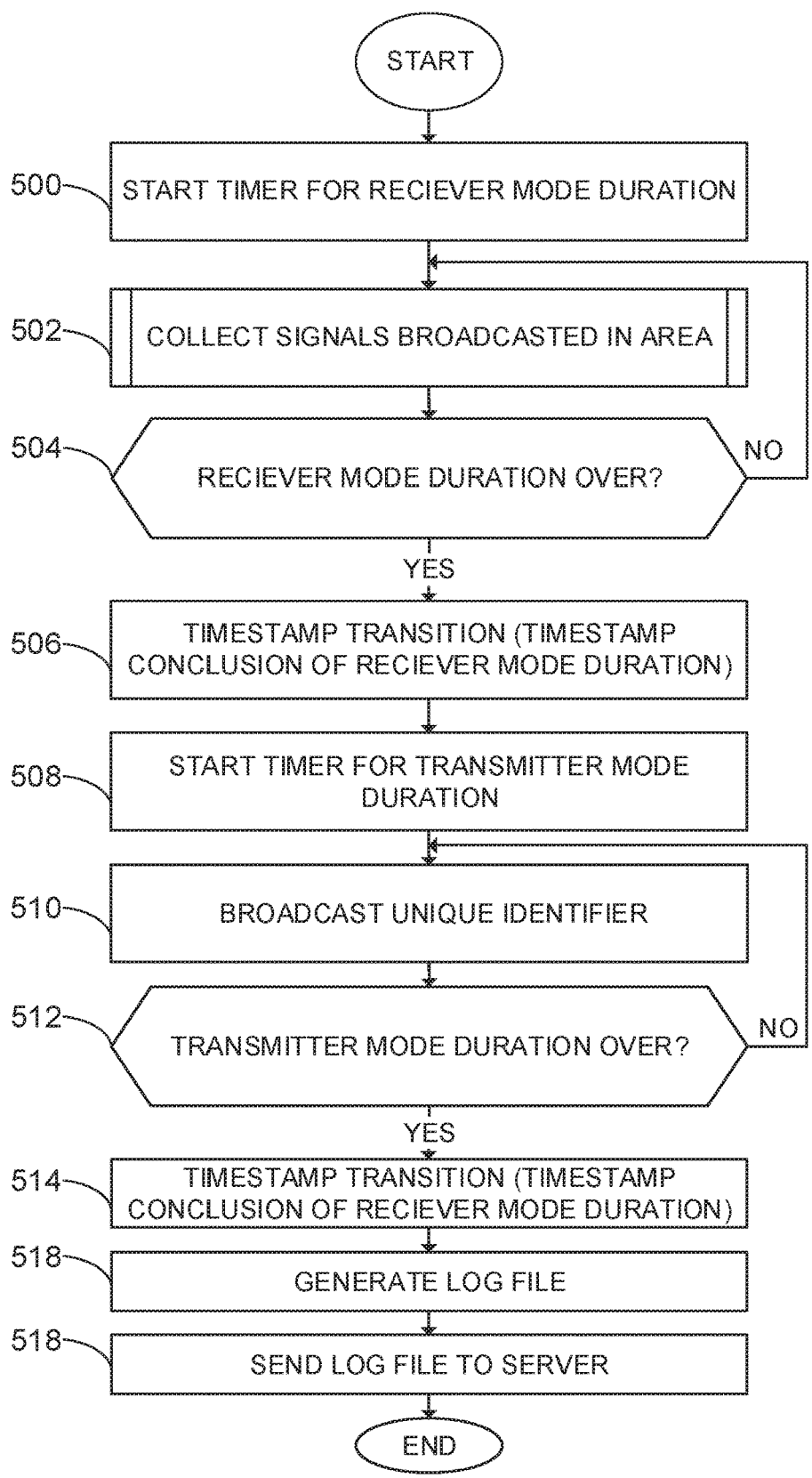
FIG. 5 is a flowchart representative of example machine readable instructions that may be executed to implement wireless access points and/or mobile devices of the example mobile device location detection systems of FIGS. 1 and 3.

FIG. 5 is an example flowchart representative of machine readable instructions that may be executed to implement the access points 102a-d and/or the mobile device 104 of FIGS. 1-3 to generate log files (e.g., the log file 400 of FIG. 4) of signals broadcasted in an area. The program of FIG. 5 begins at block 500 when the example timer 308 starts for a receiver mode duration (e.g., a receiver mode of a device location phase). For example, the data collector 306 or a processor may program the timer 308 for a duration of the receiver mode of the device location phase. The example data collector 306 collects signal information of signals broadcasted in the area by other wireless devices (block 502). For example, the data collector 306 collects signals received by the transceiver 304 from other access points 102 in the area. An example process that may be used to implement block 502 is described below in connection with FIG. 6. The example timer 308 determines if the receiver mode duration is over (block 504). For example, when the timer 306 expires, the timer 306 identifies that the receiver mode of the device location phase has ended. If the receiver mode duration is not over, the example data collector 306 continues to collect signal information of signals broadcasted in the area (block 502). If the receiver mode duration is over, the example data collector 306 timestamps the conclusion of the receiver mode duration (block 506). For example, the data collector 306 stores the second transition timestamp 405 in the log file 400 of FIG. 4. The example timer 308 starts for the transmitter mode duration (e.g., a transmit mode of the device location phase) (block 508). For example, the data collector 306 or a processor may program the timer 308 for the transmitter mode duration. During the transmitter mode duration, the example transceiver 304 broadcasts a unique identifier of the access point 102 (block 510). For example, the data collector 306 broadcasts the SSID of the access point 102 to other wireless devices via the transceiver 304. The timer 308 determines if the transmitter mode duration is over (block 512). For example, when the timer 308 expires, the data collector 306 or the processor identifies that the transmitter mode for the device location phase has ended. If the transmitter mode duration is not over, the example transceiver 304 continues to broadcast the unique identifier (block 510). If the transmitter mode duration is over, the example data collector 306 timestamps the conclusion of the transmitter mode duration (block 514). For example, the data collector 306 stores the third transition timestamp 407 in the log file 400 of FIG. 4. At block 516 the log generator 310 groups the collected data and generates log files. For example, the log generator 310 generates the received signals log entries 404 of the log file 400 of FIG. 4. A communications interface of the access point 102 sends the log file 400 to the server 108 (block 518). The example process of FIG. 5 then ends.

Figure 6:
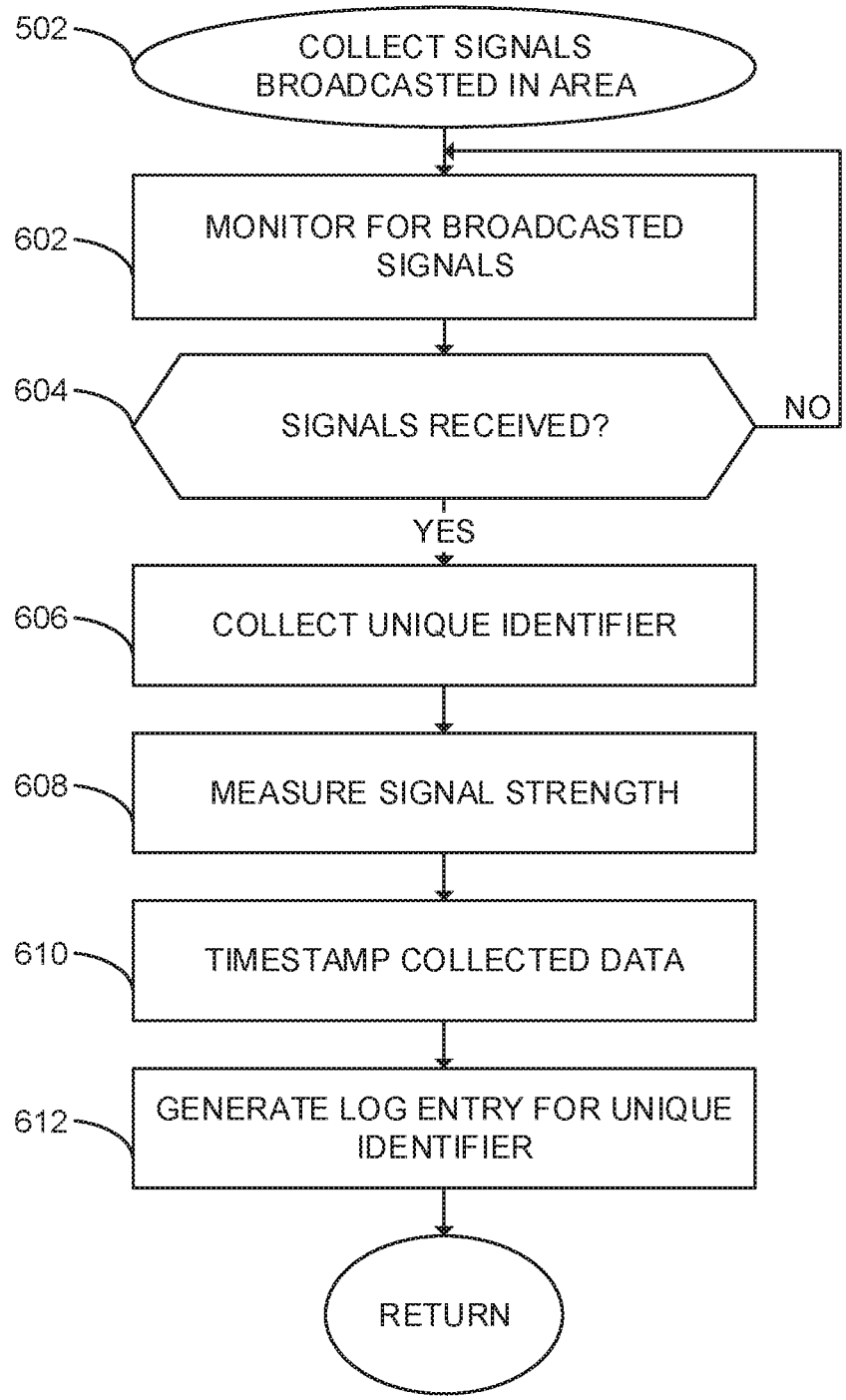
FIG. 6 is a flowchart representative of example machine readable instructions that may be executed to collect signals broadcasted in an area to implement the example mobile device location detection systems of FIGS. 1 and 3.

FIG. 6 is a flowchart representative of example machine readable instructions that may be executed to implement the processes of block 502 to collect signals broadcasted in an area. The program of FIG. 6 begins at block 602 when the example data collector 306 monitors for broadcasted signals. Next the example data collector 306 determines if any signals have been received (block 604). For example, the data collector 306 identifies if any wireless signals from other devices have been received via the transceiver 304 (FIG. 3) of the access point 102. If no signals have been received, the data collector 306 continues to monitor for broadcasted signals (block 602). If a signal is received, the example data collector 306 collects a unique identifier (block 606). For example, the data collector 306 collects a unique identifier of the transmitting device. The data collector 306 measures a signal strength (block 608). For example, the data collector 306 measures the signal strength in dBm. The example data collector 306 generates a timestamp for the collected data (block 610). For example, the data collector 306 generates a timestamp indicative of when the signal was received. The example data collector 306 generates an entry for the unique identifier (block 612). For example, the data collector 306 stores the unique identifier, the signal strength and the timestamp together in a corresponding log entry of the received signals log entries 404 of FIG. 4. The process of FIG. 6 then returns to block 504.

Figure 7:
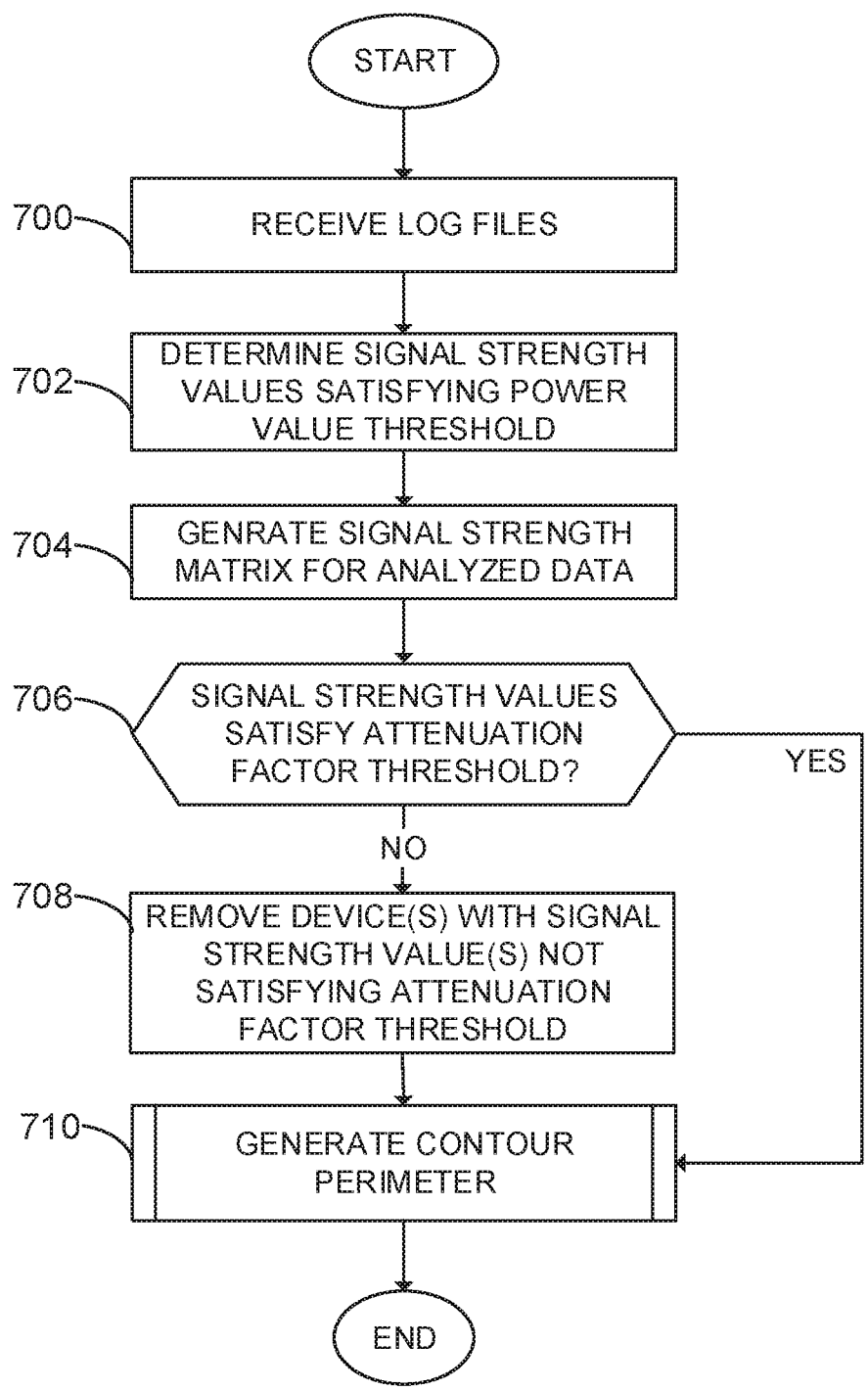
FIG. 7 is a flowchart representative of example machine readable instructions that may be executed to implement the example mobile device location detection systems of FIGS. 1 and 3.

FIG. 7 is an example flowchart representative of machine readable instructions that may be executed to implement the server 108 of FIGS. 1-3 to generate contour perimeters (e.g., the contour perimeters A-D of FIGS. 1 and 2). The program of FIG. 7 begins when the example signal strength analyzer 320 receives log files from the access points 102a-d and the mobile device 104 (block 700). For example, the signal strength analyzer 320 receives log files similar to the log file 400 of FIG. 4. The example signal strength analyzer 320 determines what signal strength values satisfy a power value threshold (block 702). For example, the signal strength analyzer 320 determines what signal strength values recorded in the log files are greater than a threshold dBm power value. The example signal strength matrix generator 322 generates a signal strength matrix for analyzed data (block 704). For example, the signal strength matrix generator 322 uses the analyzed data from the log files and the threshold determination from the signal strength analyzer 320 of block 720 to populate a matrix with the analyzed data similar to the signal strength matrices 110 and 112 of FIG. 1. The example neural network 324 determines if the signal strength values satisfy an attenuation factor range (block 706). For example, the neural network 324 determines if the signal strength values are within an attenuation factor tolerance (e.g., defined by upper and lower threshold attenuation factors) for a specific transmission path stored in the neural network 324. If the signal strength values do not satisfy the attenuation factor range, the neural network 324 removes devices from the signal strength matrix 112 with signal strength values not satisfying the attenuation factor range (block 708). For example, the neural network 324 may identify that an attenuation factor for a transmission path from the access point 102a to the access point 102d is outside of the attenuation factor tolerance for that transmission path. Additionally, the neural network 324 may identify the attenuation factor for a transmission path from the access point 102d to the mobile device 104 is outside of the attenuation factor tolerance for that transmission path. Further, the neural network 324 may identify that an attenuation factor for a transmission path from the access point 102a to the mobile device 104 is within the attenuation factor tolerance for that transmission path. As such, the neural network 324 may remove the access point 102d from the signal strength matrix 112 from further processing. If the signal strength values satisfy the attenuation factor range, or after the neural network 324 removes device(s) and corresponding unacceptable signal strength values from the signal strength matrix 110 at block 708, control advances to block 710. The contour perimeter generator 326 generates contour perimeters based on the signal strength values that satisfy the threshold (block 710). The example process of FIG. 7 ends.

Figure 8:
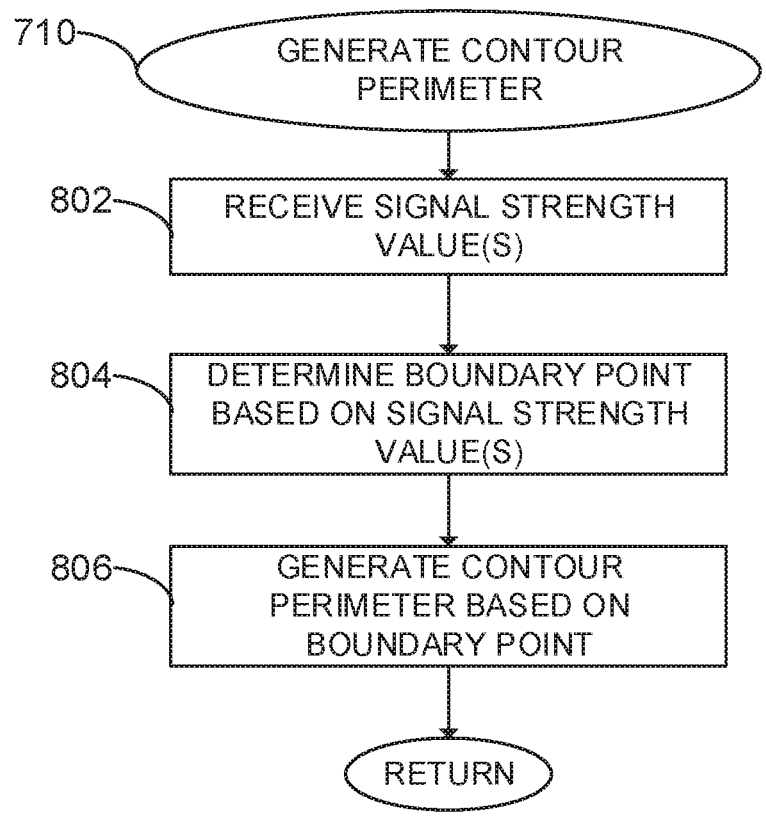
FIG. 8 is a flowchart representative of machine readable instructions that may be executed to generate contour perimeters to implement the example mobile device location detection systems of FIGS. 1 and 3.

FIG. 8 is an example flowchart representative of machine readable instructions that may be executed to implement the example mobile device location detection systems of FIGS. 1 and 3, and to perform the processes of FIG. 7 to generate contour perimeters. The example process begins at block 802 when the contour perimeter generator 326 receives the signal strength value matrix 110 from the neural network 324. The example contour perimeter generator 326 determines a boundary point based on the signal strength values (block 804). For example, the contour perimeter generator 326 may identify a distance from the known location of an access point based on the signal strength to isolate the boundary point. The example contour perimeter generator 326 generates a contour perimeter based on the boundary point (block 806). For example, the contour perimeter generator 326 may extend a boundary around an access point based on the identified boundary point. The process of FIG. 8 returns to block 710.

Figure 9:
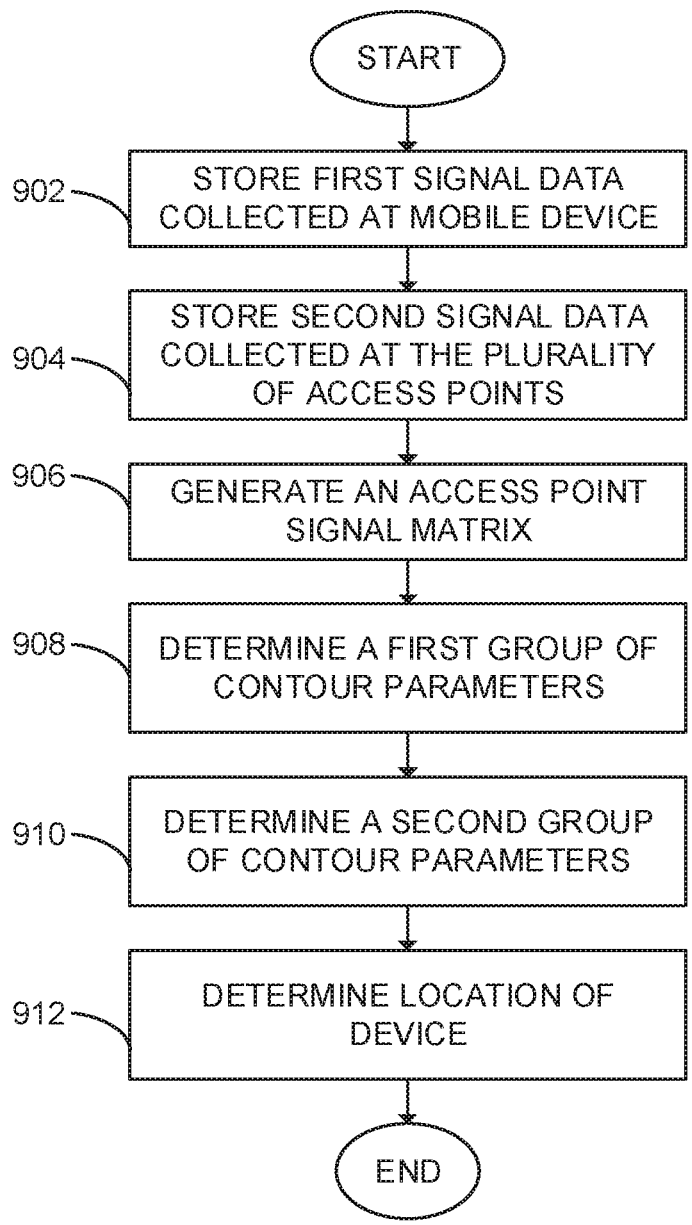
FIG. 9 is a flowchart representative of machine readable instructions that may be executed to implement the example mobile device location detection systems of FIGS. 1 and 3.

FIG. 9 is an example flowchart representative of machine readable instructions that may be executed to implement a computer (e.g., the server 108 of FIGS. 1-3) to correct the physical location of the mobile device 104 of FIGS. 1-3. The program of FIG. 9 begins at block 902 when the data interface 319 stores first signal data collected at the mobile device 104. For example, the first signal data corresponds to first signals received at the mobile device 104 from the access points 102a-d for a first period of time (e.g., a first receiver mode duration). In the illustrated example, the data interface 319 stores the first signal data in the form of log files 400 in the log store 303 of FIG. 3. At block 904, the data interface 319 stores second signal data collected at a receiving one of the plurality of access points 102a-d. For example, the second signal data corresponds to second signals received from the mobile device 104 and transmitting ones of the plurality of access points 102a-d for a second period of time (e.g., a second receiver mode duration). At block 906, the signal strength matrix generator 322 generates an access point signal matrix (e.g., the signal strength matrix 112 of FIG. 1). For example, the signal strength matrix generator 322 generates the access point signal strength matrix based on signal strength values from the first signal data collected at a mobile device 104 corresponding to first signals received from a plurality of access points 102a-d for a first period of time, and from second signal data collected at the plurality of access points 102a-d corresponding to second signals received from the mobile device 104 and the plurality of access points 102a-d for a second period of time. At block 908, the contour perimeter generator 326 determines a first group of contour perimeters (e.g., the contour perimeters A-D of FIGS. 1 and 2). For example, the contour perimeter generator 326 determines a first group of contour perimeters corresponding to first ones of the signal strength values in the access point signal matrix 112 that satisfy a first threshold, the first group of contour perimeters including an obstructed contour perimeter (e.g., obstructed contour perimeter D 116) corresponding to second ones of the signal strength values in the access point signal matrix that do not satisfy the first threshold. At block 910, the neural network 324 and the contour perimeter generator 326 determine a second group of contour perimeters. For example, the neural network 324 and the contour perimeter generator 326 determine a second group of contour perimeters by replacing the obstructed contour perimeter (e.g., obstructed contour perimeter D 116 of FIG. 1) with a corrected contour perimeter (e.g., corrected contour perimeter D 118 of FIG. 1). At block 912, the location determiner 328 determines a location of the mobile device 104. For example, the location determiner 328 determines a location of the mobile device 104 based on the second group of contour perimeters including the corrected contour perimeter. The location is the union of the resulting contour perimeters of each access point 102a-d that received a signal from the mobile device 104. For example, when each access point 102a-d receives the signal from the mobile device 104, each access point 102a-d measures the signal strength value of the received signal from the mobile device 104. In some examples, the signal strength measurement is a value and not a vector. The example location determiner 328 determines contour perimeters for the access points 102a-d based on the known locations of the access points 102a-d and the signal strengths received from transmitting ones of access points 102a-d and signals transmitted to receiving ones of access points 102a-d. To determine the location of the mobile device 104, the example location determiner 328 determines the intersection of the resulting contour perimeters generated based on the received signal strengths of the mobile device 104. The intersection is identified as the physical location of the mobile device 104. The example process of FIG. 9 ends.

Figure 10:
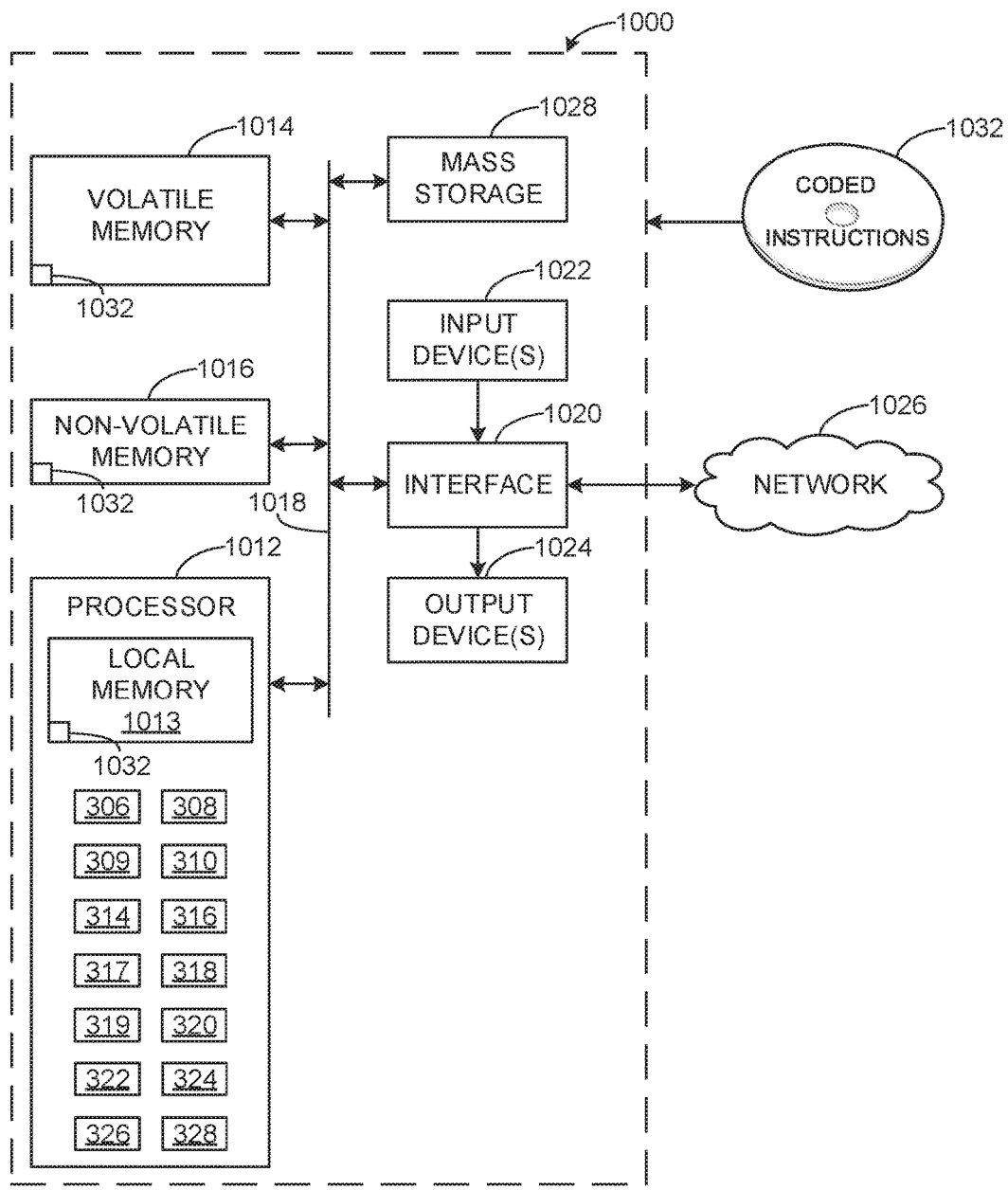
FIG. 10 is a block diagram of an example processor platform capable of executing the instructions of FIGS. 5, 6, 7, 8 and/or 9 to implement the example mobile device location detection systems of FIGS. 1 and 3.

FIG. 10 is a block diagram of an example processor platform 1000 capable of executing the instructions of FIGS. 5-9 to implement the example access points 102a-d, the example mobile device 104, and the example server 108 of FIGS. 1-3. The processor platform 1000 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors or controllers from any desired family or manufacturer. The hardware processor may be a semiconductor based (e.g., silicon based) device. In this example, the processor implements the example data collector 306, the example timer 308, the example counter 309, the example log generator 310 of the example access point 102, the example data collector 314, the example timer 316, the example counter 317, the example log generator 318 of the example mobile device 104, the example data interface 319, the example signal strength analyzer 320, the example signal strength matrix generator 322, the example neural network 324, the example contour perimeter generator 326, the example location determiner 328 of the example server 108 and/or, more generally, the example access point 102, the example mobile device 104, and/or the example server 108

The processor 1012 of the illustrated example includes a local memory 1013 (e.g., a cache). The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), and/or a PCI express interface.

In the illustrated example, one or more input devices 1022 are connected to the interface circuit 1020. The input device(s) 1022 permit(s) a user to enter data and commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1020 of the illustrated example, thus, typically includes a graphics driver card, a graphics driver chip or a graphics driver processor.

The interface circuit 1020 of the illustrated example also includes a communication device such as a transmitter, a receiver, a transceiver, a modem and/or network interface card to facilitate exchange of data with external machines (e.g., computing devices of any kind) via a network 1026 (e.g., an Ethernet connection, a digital subscriber line (DSL), a telephone line, coaxial cable, a cellular telephone system, etc.).

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, RAID systems, and digital versatile disk (DVD) drives.

The coded instructions 1032 of FIGS. 5-9 may be stored in the mass storage device 1028, in the volatile memory 1014, in the non-volatile memory 1016, and/or on a removable tangible computer readable storage medium such as a CD or DVD.

From the foregoing, it will be appreciated that example methods, apparatus have been disclosed for locating mobile devices using wireless signals in mixed mode. Prior methods for determining physical locations of a mobile device use a one-way signal from an access point to the mobile device. This becomes problematic when the line of sight between the access point and the mobile device is obstructed by a radio frequency attenuating obstruction. For example, the mobile device may be carried by a user walking in a mall. The user may enter a first store where the line of sight from the mobile device to an access point is obstructed by a signal-attenuating object. Additionally, the mobile device may be in the line of sight of another access point located in a second, neighboring store. In this example, the mobile device is identified as located within the second, neighboring store, even though the mobile device is located in the first store. For entities that monitor shopping habits of individuals, this is a problem because stores that were never visited are credited as having been visited. Examples disclosed herein use alternating receive modes and transmit modes between mobile devices and access points to track the locations of persons in areas in which signal-attenuating obstructions between the mobile devices and the access points substantially decrease or prevent useful wireless communications between the devices. For example, the mobile device may be carried by a user walking in a mall. The user may enter a first store where the line of sight from the mobile device to an access point is obstructed by an object. Additionally, the mobile device may be in the line of sight of another access point located in a second, neighboring store. The examples disclosed herein provide for wireless devices to operate in receive mode and transmit mode for a device location phase. As such, the mobile device receives wireless signals from a plurality of access points in the first store and transmits wireless signals to the plurality of access points in the first store for the device location phase. The disclosed examples identify an obstruction between the mobile device and one of the plurality of access points in the first store and can correctly identify the device location based on identifying the pressure of the obstruction. Thus, the mobile device is correctly identified as being in the first store.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method comprising:
generating an access point signal matrix based on signal strength values based on first signal data collected at a mobile device corresponding to first signals received from a plurality of access points for a first period of time, and based on second signal data collected at the plurality of access points corresponding to second signals received from the mobile device and the plurality of access points for a second period of time;
determining a first group of contour perimeters corresponding to first ones of the signal strength values in the access point signal matrix that satisfy a first threshold, the first group of contour perimeters including an obstructed contour perimeter corresponding to second ones of the signal strength values in the access point signal matrix that do not satisfy the first threshold;
determining a second group of contour perimeters by replacing the obstructed contour perimeter with a corrected contour perimeter; and
determining a location of the mobile device based on the second group of contour perimeters including the corrected contour perimeter.

2. The method of claim 1, wherein the first signal data includes timestamps, Service Set Identifiers and signal strength values for the plurality of access points.

3. The method of claim 1, wherein the second signal data includes timestamps, Service Set Identifiers and signal strength values for the plurality of access points, and timestamps and signal strength values for the mobile device.

4. The method of claim 1, wherein the first period of time corresponds to the mobile device operating in a receiver mode, the second period of time corresponding to the mobile device operating in a transmitter mode.

5. The method of claim 3, wherein the first signal data further includes first timestamps of the beginning of each period of time and second timestamps of the conclusion of each period of time to determine which signal strength values correspond to the transmit mode and the receive mode in the access point signal matrix.

6. The method of claim 1, wherein the determining of the first group of the contour perimeters includes identifying boundary points based on the signal strength values.

7. The method of claim 1, wherein the determining of the location of the mobile device includes determining an intersection of the contour perimeters of the second group, the intersection is the location of the mobile device.

8. The method of claim 1, further including removing the second ones of the signal strength values from the access point signal matrix that do not meet the threshold.

9. The method of claim 1, wherein the threshold is based on attenuation factors between the mobile device and the plurality of access points.

10. The method of claim 1, wherein the plurality of access points are located at known locations.

11. An apparatus comprising: a server including a processor, the server to generate an access point signal matrix based on signal strength values based on first signal data collected at a mobile device corresponding to first signals received from a plurality of access points for a first period of time, and based on second signal data collected at the plurality of access points corresponding to second signals received from the mobile device and the plurality of access points for a second period of time; determine a first group of contour perimeters corresponding to first ones of the signal strength values in the access point signal matrix that satisfy a first threshold, the first group of contour perimeters including an obstructed contour perimeter corresponding to second ones of the signal strength values in the access point signal matrix that do not satisfy the first threshold; determine a second group of contour perimeters by replacing the obstructed contour perimeter with a corrected contour perimeter; and determine a location of the mobile device based on the second group of contour perimeters including the corrected contour perimeter.

12. The apparatus of claim 11, wherein the first period of time corresponds to the mobile device operating in a receiver mode, the second period of time corresponding to the mobile device operating in a transmitter mode.

13. The apparatus of claim 12, wherein the server to determine which signal strength values correspond to the transmit mode and the receive mode in the access point signal matrix based on first timestamps corresponding to the beginning of each period of time and second timestamps corresponding to the conclusion of each period of time.

14. The apparatus of claim 11, wherein the server is to determine boundary points based on the signal strength values and identify an intersection of the contour perimeters of the second group, the intersection is the location of the mobile device.

15. A non-transitory computer-readable medium comprising instructions that, when executed, cause a processor to, at least:
generate an access point signal matrix based on signal strength values based on first signal data collected at a mobile device corresponding to first signals received from a plurality of access points for a first period of time, and based on second signal data collected at the plurality of access points corresponding to second signals received from the mobile device and the plurality of access points for a second period of time;
determine a first group of contour perimeters corresponding to first ones of the signal strength values in the access point signal matrix that satisfy a first threshold, the first group of contour perimeters including an obstructed contour perimeter corresponding to second ones of the signal strength values in the access point signal matrix that do not satisfy the first threshold;
determine a second group of contour perimeters by replacing the obstructed contour perimeter with a corrected contour perimeter; and determine a location of the mobile device based on the second group of contour perimeters including the corrected contour perimeter.

16. The non-transitory computer readable medium as defined in claim 15, wherein the first and second signal data includes timestamps, Service Set Identifiers and signal strength values for the plurality of access points, the second signal data further including timestamps and signal strength values for the mobile device.

17. The non-transitory computer readable medium as defined in claim 15, wherein the first period of time corresponds to the mobile device operating in a receiver mode, the second period of time corresponding to the mobile device operating in a transmitter mode.

18. The non-transitory computer readable medium as defined in claim 17, wherein the instructions, when executed, further cause the processor to determine which signal strength values correspond to the transmit mode and the receive mode in the access point signal matrix based on first timestamps of the beginning of each period of time and second timestamps of the conclusion of each period of time.

19. The non-transitory computer readable medium as defined in claim 15, wherein the instructions, when executed, further cause the processor to determine the location of the mobile device by determining boundary points based on the signal strength values and determining an intersection of the contour perimeters of the second group, the intersection is the location of the mobile device.

20. The non-transitory computer readable medium as defined in claim 15, wherein the instructions, when executed, further cause the processor to remove the second ones of the signal strength values from the access point signal matrix that do not meet the threshold.

* * * * *